United States Patent
Dong et al.

(10) Patent No.: US 11,627,473 B2
(45) Date of Patent: Apr. 11, 2023

(54) METHOD FOR DETERMINING WIRELESS COMMUNICATION NETWORK LAYOUT

(71) Applicant: City University of Hong Kong, Hong Kong (HK)

(72) Inventors: Miaomiao Dong, Hong Kong (HK); Jingjin Timothy Wu, Hong Kong (HK); Wing-Ming Eric Wong, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 58 days.

(21) Appl. No.: 17/367,453

(22) Filed: Jul. 5, 2021

(65) Prior Publication Data
US 2022/0007203 A1 Jan. 6, 2022

Related U.S. Application Data

(60) Provisional application No. 63/048,223, filed on Jul. 6, 2020.

(51) Int. Cl.
 *H04W 16/18* (2009.01)
 *H04W 28/16* (2009.01)
 *H04W 88/08* (2009.01)

(52) U.S. Cl.
 CPC ........... *H04W 16/18* (2013.01); *H04W 28/16* (2013.01); *H04W 88/08* (2013.01)

(58) Field of Classification Search
 CPC ...... H04W 16/18; H04W 28/16; H04W 88/08
 See application file for complete search history.

(56) References Cited

U.S. PATENT DOCUMENTS

| | | | | |
|---|---|---|---|---|
| 5,561,841 A * | 10/1996 | Markus | ................ | H04W 16/18 455/67.7 |
| 6,041,236 A * | 3/2000 | Bernardin | ............. | H04W 16/18 455/446 |
| 6,094,580 A * | 7/2000 | Yu | ......................... | H04W 16/18 455/449 |
| 6,539,221 B1 * | 3/2003 | Vasudevan | ............ | H04W 16/18 455/67.11 |
| 7,738,880 B2 * | 6/2010 | Wang | .................... | H04W 64/00 455/456.1 |

(Continued)

FOREIGN PATENT DOCUMENTS

| | | |
|---|---|---|
| CN | 110351735 A | 10/2019 |
| CN | 110418354 A | 11/2019 |
| EP | 1654898 B1 * | 1/2011 ............ H04W 16/18 |

*Primary Examiner* — Matthew C Sams
(74) *Attorney, Agent, or Firm* — Idea Intellectual Limited; Margaret A. Burke; Sam T. Yip

(57) ABSTRACT

A method for determining a layout of a wireless communication network is provided in the present invention. Numerous realizations of user device placement in a considered geometry are measured to reflect the practical distribution of the user devices in a more accurate way than the conventional approach which emulates the randomness of placements of user devices using a tractable stochastic process. Moreover, a scenario sampling approach is used to provide a lower-complexity and higher efficient way to yield optimal base station deployment results while guaranteeing the quality of service of a specified majority of the overall user device realizations.

6 Claims, 3 Drawing Sheets

(56) References Cited

U.S. PATENT DOCUMENTS

| | | | | |
|---|---|---|---|---|
| 7,949,503 B2* | 5/2011 | Aldajani | ............... | G06Q 10/04 |
| | | | | 703/2 |
| 2014/0357281 A1* | 12/2014 | Selim | ................... | H04W 16/18 |
| | | | | 455/446 |
| 2022/0007203 A1* | 1/2022 | Dong | ................... | H04W 88/08 |

* cited by examiner

METHOD FOR DETERMINING WIRELESS COMMUNICATION NETWORK LAYOUT

CROSS-REFERENCE TO RELATED APPLICATIONS

The present application claims priority from U.S. Provisional Patent Application No. 63/048,223 filed Jul. 6, 2020, and the disclosure of which is incorporated herein by reference in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to communication networks. More specifically, the present invention relates to techniques for determination of layout of wireless communication network, construction of wireless communication network, operation of wireless communication network, and a wireless communication network so determined or deployed.

BACKGROUND OF THE INVENTION

In the stage of base station deployment (e.g., construction, installation) in a wireless communication network placements of user devices in a considered geometry are random and have numerous realizations. Such randomness is conventionally emulated by tractable stochastic models, e.g., Poisson point process (PPP). An existing challenge is that the stochastic models cannot accurately emulate distributions of user devices in a practical geometry, which is especially critical to a millimeter wave (mmWave) communication networks which is becoming an indispensable part of the Fifth Generation (5G) communication systems.

SUMMARY OF THE INVENTION

According to one aspect of the present invention, a method is provided for determining a layout of a wireless communication network in an area having an environmental geometry constituted with a B number of candidate base station locations. The method comprises: measuring user-device placement in the area at K different times to obtain a set of K realizations of user-device placement, where K is in the order of $10^3$, $10^4$, $10^5$, $10^6$ or $10^7$; selecting, uniformly, independently and/or randomly, a N number of realization samples from the set of K measured realizations of user-device placement based on a scenario sampling approach, where N<<K; and solving a base station deployment model formulated with the N selected realization samples to determine respective optimal states of one or more or all of the plurality of the B candidate base station locations to form the layout of the wireless communication network.

By measuring numerous realizations of user device placement in a considered geometry, the present invention can reflect the practical distribution of the user devices in a more accurate way than the conventional approach, which emulates the randomness of placements of user devices using a tractable stochastic process. Moreover, the scenario sampling approach provides a lower-complexity and higher-efficient way to yield optimal base station deployment results while guaranteeing QoS of a specified majority of the overall user devices realizations.

BRIEF DESCRIPTION OF THE DRAWINGS

Embodiments of the invention are described in more detail hereinafter with reference to the drawings, in which.

DETAILED DESCRIPTION

In the following description, a method for determining a layout of the wireless communication network and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

In accordance with some embodiments of the present invention, the wireless communication network may include a plurality of base stations to be deployed for serving one or more user devices in an area $\mathcal{A}$. The area $\mathcal{A}$ may have different environmental geometry with arbitrary candidate base station (BS) locations.

Figure 1:
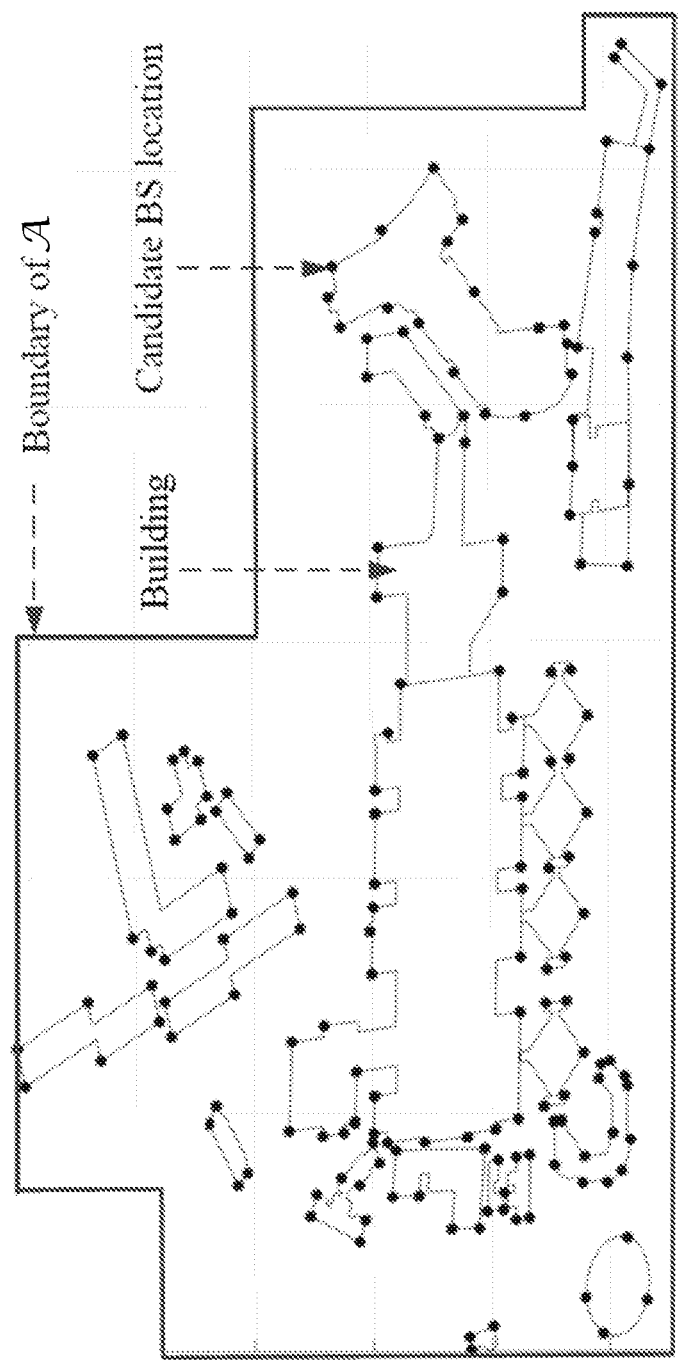
FIG. 1 depicts a layout of an area to be deployed with base stations of a wireless communication network.

Referring to FIG. 1, which depicts a layout of the area $\mathcal{A}$. The area $\mathcal{A}$ may have an environmental geometry constituted one or more buildings and a plurality of candidate BS locations pre-determined on the buildings and indexed by $b \in \{1, 2, \ldots, B\}$, where B is the number of candidate BS locations in the environmental geometry of area $\mathcal{A}$. Practically, a subset of the candidate locations may be selected to deploy (or install) BSs. A BS deployment vector $y=[y_1, y_2, \ldots, y_B]^T$ may be used to denote the state of each candidate BS location. If a BS is deployed at the $b^{th}$ location, then the $b^{th}$ element of y is set to be one, i.e., $y_b=1$, otherwise $y_b=0$. In other words, a candidate BS location can be occupied by only one BS.

Figure 2:
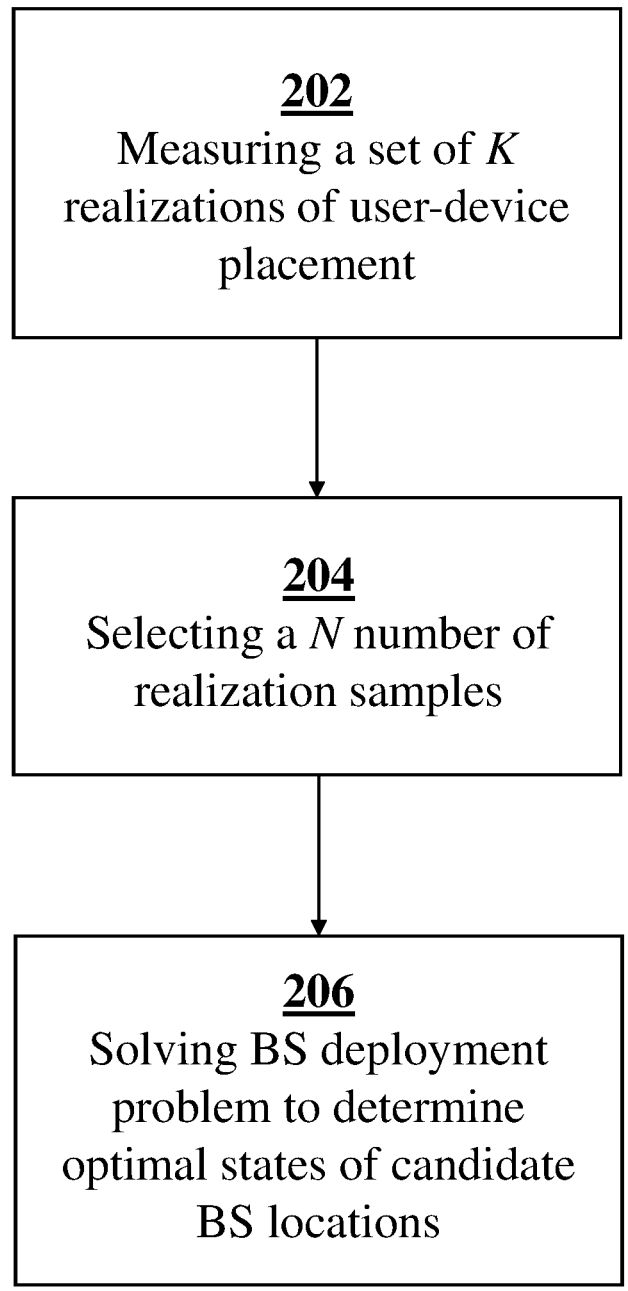
FIG. 2 depicts a flowchart of a method for determining a layout of the wireless communication network in accordance with a preferred embodiment of the present invention.

Referring to FIG. 2, which depicts a flowchart of the method for determining the layout of the wireless communication network. The method comprises a step of 202: measuring, a set of realizations of user-device placement, denoted as $\Delta_K=\{\delta_1, \delta_2, \ldots, \delta_K\}$, in the area $\mathcal{A}$ at K different times respectively, where K is the number of measured realizations of user-device placement in set $\Delta_K$.

Preferably, the number K of measured realization is in an order of $10^3$, $10^4$, $10^5$, $10^6$ or $10^7$, for accurately reflecting the distribution of user devices in the area $\mathcal{A}$.

For a realization $\delta$ in the set $\Delta_K$, i.e., $\delta \in \Delta_K$, the number of active user device, denoted as $U^{(\delta)}$, and the locations of these user devices are known. On this basis, a closed-form expression of a quality of service (QoS) constraint per user device as a function of the BS deployment vector y may be formulated. For a user device $u^{(\delta)} \in \{1, 2, \ldots, U^{(\delta)}\}$ in the realization $\delta$, a generic form of the QoS constraint may be given by:

$$g(u^{(\delta)}, y) \leq 0, \forall u^{(\delta)} \in \{1, 2, \ldots, U^{(\delta)}\}.$$

The objective of the BS deployment is to minimize the BS deployment cost to service the sampled user devices with guaranteed QoS. In this way, the BS deployment model may be defined as a first base station deployment model:

$$\min \Sigma_{b=1}^{B} y_b$$

$$s.t.: g(u^{(\delta)}, y) \leq 0, \forall u^{(\delta)} \in \{1, 2, \ldots, U^{(\delta)}\}, \delta \in \Delta_K,$$

where $\Sigma_{b=1}^{B} y_b$ is the objective function that minimizes the number of BSs required (deployed or to be deployed) under the QoS constraint per user device.

Due to the large number K of elements in $\Delta_K$, the number of constraints in Problem (1) is $\Sigma_{k=1}^{K} U^{(\delta_k)}$, which is critically large and leads to a large-scale problem that requires prohibitive amounts of computing resources (such as random-access memory (RAM)) to store and process the constraints.

Referring back to FIG. 1. The method may further comprise a step of 204: selecting, uniformly, independently and/or randomly, a N number of realization samples, denoted as $\Delta_N = \{\delta_1, \delta_2, \ldots, \delta_N\}$, where N<<K, from the set of K number of measured realizations of user-device placement based on a scenario sampling approach.

Therefore, the first base station deployment model may be reduced to a second base station deployment model:

$$\min \Sigma_{b=1}^{B} y_b$$

$$s.t.: g(u^{(\delta)}, y) \leq 0, \forall u^{(\delta)} \in \{1, 2, \ldots, U^{(\delta)}\}, \delta \in \Delta_N.$$

Compared with the first base station deployment model, the second base station deployment model has less constraints and thus is easier to solve. Optimal solution of the second base station deployment model, denoted as $y^*_{\Delta_N}$, can guarantee the QoS for a portion of the user devices realizations $\delta \in \Delta_K$.

Preferably, a lower bound of required number of realization samples may be determined under a QoS criterion such that the QoS for a specified majority of user devices realizations in the number K of measured realization are guaranteed.

To this end, a violation probability of $y^*_{\Delta_N}$ may be defined to indicate the probability that the optimal solution $y^*_{\Delta_N}$ violates the QoS constraint for UEs in realization $\delta \in \Delta_K$ and expressed as:

$$V(y^*_{\Delta_N}) = Pr(\delta \in \Delta_K | g(u^{(\delta)}, y) > 0 \text{ for some } u^{(\delta)} \in \{1, 2, \ldots, U^{(\delta)}\}).$$

Different $\Delta_N$ in the second base station deployment model may have different optimal solutions $y^*_{\Delta_N}$ and different violation probabilities $V(y^*_{\Delta_N})$.

It may be declared that a solution $y^*_{\Delta_N}$ is robust if its $V(y^*_{\Delta_N}) \leq \epsilon$, where $\epsilon > 0$ is an arbitrary small value. The set of $\Delta_N$ of which the corresponding optimal solution $y^*_{\Delta_N}$ in the second base station deployment model is not robust may be defined as:

$$\Delta_N' = \{\Delta_N = \{\delta_1, \delta_2, \ldots, \delta_N\} | V(y^*_{\Delta_N}) > \epsilon\}.$$

To guarantee that a randomly sampled $\Delta_N$ generates a robust solution in the second base station deployment model with probability $1 - \gamma$, it is required that the probability of that the set of $\Delta_N$ of which the corresponding optimal solution in the second base station deployment model is not robust is less than or equal to $\gamma$, that is, $Pr(\Delta_N') \leq \gamma$, where $\gamma > 0$ is an arbitrary small constant.

As N grows, both $V(y^*_{\Delta_N})$ and $Pr(\Delta_N')$ decrease. Particularly, if N is equal to the number K, then $V(y^*_{\Delta_N}) = V(y^*_{\Delta_N}) = 0$, $Pr(\Delta_N') = 0$.

Therefore, a lower bound $\overline{N}(\epsilon, \gamma)$ of N can be found so that any $N \geq \overline{N}(\epsilon, \gamma)$ guarantees the condition that $Pr(\Delta_N') \leq \gamma$.

As there exists a subset $\Delta_B \in \Delta_N$ such that, for N>B, any optimal solution to the second base station deployment model is also optimal to the following problem:

$$\min \Sigma_{b=1}^{B} y_b$$

$$s.t.: g(u^{(\delta)}, y) \leq 0, \forall u^{(\delta)} \in \{1, 2, \ldots, U^{(\delta)}\}, \delta \in \Delta_B.$$

The lower bound $\overline{N}(\epsilon, \gamma)$ of the number of realization samples N that guarantees a robust solution with probability exceeding $1 - \gamma$ may be given by:

$$\overline{N}(\epsilon, \gamma) = \left\lceil B + \frac{\ln \gamma - (K-B) \ln \frac{K}{K-B} - B \ln \frac{K}{B} - \ln \binom{B}{B/2}}{\ln(1-\epsilon)} \right\rceil,$$

for even B $$\overline{N}(\epsilon, \gamma) = \left\lceil B + \frac{\ln \gamma - (K-B) \ln \frac{K}{K-B} - B \ln \frac{K}{B} - \ln \binom{B}{B/2+1/2}}{\ln(1-\epsilon)} \right\rceil,$$

for odd B where $\lceil \chi \rceil$ is the smallest integer larger than or equal to $\chi$, K is the number of measured realizations of user-device placement in set $\Delta_K$, and B is the number of candidate BS locations in the environmental geometry of area $\mathcal{A}$.

For example, when $K = 10^6$ and $B = 138$, values of the lower bound $\overline{N}(\epsilon, \gamma)$ are presented in Table 1 below:

| $(\epsilon, \gamma)$ | (0.15, 0.1) | (0.1, 0.05) | (0.05, 0.05) |
|---|---|---|---|
| $\overline{N}(\epsilon, \gamma)$ | 9121 | 14001 | 28613 |

Referring back to FIG. 1, the method further comprises a step of 206: solving the second base station deployment model to obtain the optimal base station deployment states of the plurality of the B candidate base station locations to form the layout of the wireless communication network.

As the lower bound $\overline{N}(\epsilon, \gamma)$ is much smaller than the total number K of measured realizations, that is $\overline{N}(\epsilon, \gamma) \ll K$, the step 206 of determination of deployment location of BSs can be performed in a low-complexity and effective manner.

Figure 3:
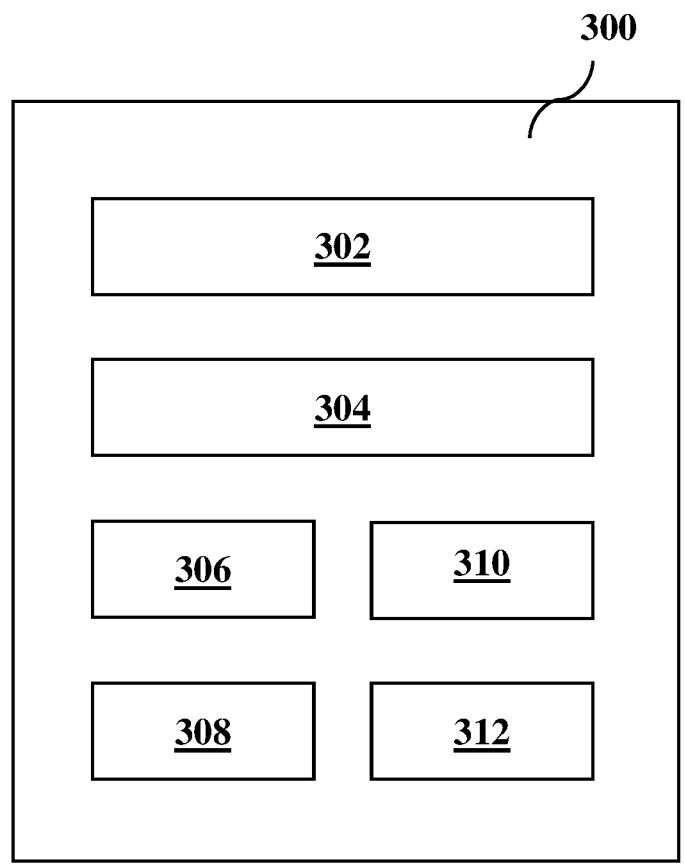
FIG. 3 depicts a schematic diagram of a system for determining a layout of a wireless communication network in accordance with some embodiments of the present invention.

FIG. 3 shows a schematic diagram of a system 300 for determining a layout of a wireless communication network in accordance with some embodiments of the present invention. The system 300 may have different configurations, and it generally comprises suitable components necessary to receive, store, and execute appropriate computer instructions, commands, or codes.

Referring to FIG. 3. The system 300 may comprise a processor 302 configured to: measure user-device placement in the area at K different times to obtain a set of K realizations of user-device placement; select, uniformly, independently and/or randomly, a N number of realization samples from the set of K measured realizations of user-device placement based on a scenario sampling approach, where N<<K; and solve a base station deployment model formulated with the N selected realization samples to determine respective optimal states of one or more or all of the plurality of the B candidate base station locations to form the layout of the wireless communication network.

The processor 302 may be formed by one or more of: central processing unit (CPU), microcontroller unit (MCU), controllers, logic circuits, Raspberry Pi chip, digital signal processor (DSP), application-specific integrated circuit (ASIC), Field-Programmable Gate Array (FPGA), or any other digital or analog circuitry, programmable logic devices configured to interpret and/or to execute program instructions and/or to process data.

Preferably, the system 300 may further include one or more memory units 304 such as volatile memory unit (such as random-access memory (RAM), dynamic random-access memory (DRAM), static random-access memory (SRAM)), one or more nonvolatile memory unit (such as read-only memory (ROM), programmable read-only memory (PROM), erasable programmable read-only memory (EPROM), electrically erasable programmable read-only memory (EEPROM), ferroelectric random-access memory (FRAM), magneto-resistive random-access memory (MRAM), magneto-optical disks, flash memory, solid-state drive (SSD), NAND flash memory, and nonvolatile dual in-line memory module (NVDIMM)), or any of their combinations.

Preferably, the system 300 may further include one or more input devices 306 such as a keyboard, a mouse, a stylus, an image scanner, a microphone, a tactile input device (e.g., touch sensitive screen), and an image/video input device (e.g., camera).

Preferably, the system 300 may further include one or more output devices 308 such as one or more displays (e.g., monitor), speakers, headphones, earphones, printers, 3D printers, etc. The display may include an LCD display, a LED/OLED display, or any other suitable display that may or may not be touch sensitive.

Preferably, the system 300 may further include one or more disk drives 312, which may encompass solid state drives, hard disk drives, optical drives, flash drives, and/or magnetic tape drives.

A suitable operating system may be installed on the disk drive 312 or in the memory unit 304. The memory unit 204 and the disk drive 312 may be operated by the processor 302.

The system 300 may also preferably include a communication device 310 for establishing one or more communication links (not shown) with one or more other computing devices such as servers, personal computers, terminals, tablets, phones, or other wireless or handheld computing devices. The communication device 310 may be a modem, a Network Interface Card (NIC), an integrated network interface, a radio frequency transceiver, an optical port, an infrared port, a USB connection, or other wired or wireless communication interfaces. The communication links may be wired or wireless for communicating commands, instructions, information and/or data.

Preferably, the processor 302, the memory unit 304, and optionally the input devices 306, the output devices 308, the communication device 310 and the disk drives 312 are connected with each other through a bus, a Peripheral Component Interconnect (PCI) such as PCI Express, a Universal Serial Bus (USB), an optical bus, or other like bus structure. In one embodiment, some of these components may be connected through a network such as the Internet, the Intranet, Wide Area Network (WAN), Local Area Network (LAN), a cloud computing network and other forms of data transmission medium. A person skilled in the art would appreciate that the system 300 shown in FIG. 3 is merely exemplary and different systems with different configurations may be applicable in the present invention.

Although not required, the embodiments herein described can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein. Where the methods and systems of the invention are either wholly implemented by computing system or partly implemented by computing systems, any appropriate computing system architecture may be utilized. This will include stand-alone computers, network computers, dedicated or nondedicated hardware devices. Where the terms "computing system" and "computing device" are used, these terms are intended to include any appropriate arrangement of computer or information processing hardware capable of implementing the function described, including but not limited to server computers, personal computers, laptop computers, mobile computing devices such as smartphones and tablet computers.

Computer instructions or software codes running in the computing devices, computer processors, or programmable logic devices can readily be prepared by practitioners skilled in the software or electronic art based on the teachings of the present disclosure. Computer instructions or software codes stored in computer storage media can also be used to program computers or microprocessors to perform all or a portion of the method of the present invention.

Various modifications can be made to the above embodiments. For examples, the BS can be any wireless communication device. The BS can be cellular (of 3G, 4G, 5G, or later generation) BS. The BS can be millimeter wave (mm-Wave) BS. The BSs (or more generally the wireless communication devices) may form a BS network (or more generally a wireless communication network). The user devices may be any electronic communication devices carried by or otherwise associated with the user. The user device may be a portable electronic device, such as a smart phone, a smart watch, a smart wearable, an internet of thing (IoT) device, a tablet, or the like, which can communicate at least wirelessly. The area/terrain in which the wireless communication system is arranged or is to be arranged can have any environmental geometry, such as, urban or rural, indoors or outdoors.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A method for determining a layout of a wireless communication network in an area having an environmental geometry constituted with a B number of candidate base station locations, the wireless communication network comprising a plurality of bases stations configured for serving one or more user devices, the method comprising:

measuring user-device placement in the area for K different times to obtain a set of K realizations of user-device placement;
selecting, uniformly, independently and/or randomly, a N number of realization samples from the set of K measured realizations of user-device placement based on a scenario sampling approach, where N<<K; and
solving a base station deployment model with the N selected realization samples;
wherein the base station deployment model is solved when optimal base station deployment states of the B candidate base station locations are determined to minimize a base station deployment cost while a quality of service (QoS) per user device is guaranteed; and
wherein the determined optimal base station deployment states of the B candidate base station locations form the layout of the wireless communication network; and
wherein the scenario sampling approach comprises determining a lower bound of the number N of realization samples under a criterion that quality of service for a specified majority of user devices realizations in the K measured realizations is guaranteed.

2. The method according to claim 1, wherein the number K is in an order of $10^3$, $10^4$, $10^5$, $10^6$ or $10^7$.

3. The method according to claim 1, further comprising displaying a model of the area and indications indicating the determined optimal base station deployment states of the B candidate base station locations.

4. A system for determining a layout of a wireless communication network in an area having an environmental geometry constituted with a B number of candidate base station locations, the wireless communication network comprising a plurality of bases stations configured for serving one or more user devices, the system comprising a processor configured to:
measure user-device placement in the area at K different times to obtain a set of K realizations of user-device placement;
select, uniformly, independently and/or randomly, a N number of realization samples from the set of K measured realizations of user-device placement based on a scenario sampling approach, where N<<K; and
solving a base station deployment model with the N selected realization samples;
wherein the base station deployment model is solved when optimal base station deployment states of the B candidate base station locations are determined to minimize a base station deployment cost while a quality of service (QoS) per user device is guaranteed; and
wherein the determined optimal base station deployment states of the B candidate base station locations form the layout of the wireless communication network; and
wherein the scenario sampling approach comprises determining a lower bound of the number N of realization samples under a criterion that quality of service for a specified majority of user devices realizations in the K measured realizations is guaranteed.

5. The system according to claim 4, wherein the number K is in an order of $10^3$, $10^4$, $10^5$, $10^6$ or $10^7$.

6. The system according to claim 4, further comprising a display unit configured for displaying a model of the area and indications indicating the determined optimal base station deployment states of the B candidate base station locations.

* * * * *